Patented June 25, 1946

2,402,911

UNITED STATES PATENT OFFICE 2,402,911

PLASTIC COMPOSITION

Izador J. Novak, Trumbull, Conn., and Joseph N. Kuzmick, Passaic, N. J., assignors to Raybestos-Manhattan, Inc., Passaic, N. J., a corporation of New Jersey No Drawing. Application March 8, 1943, Serial No. 478,419

13 Claims. (Cl. 260—23)

This invention relates to the production of a plastic composition having rubber-like properties, and more particularly to a combination of a vinyl resin and a non-volatile, vulcanizable plasticizer and the vulcanization treatment of the combination to reduce the thermoplasticity thereof or to form products having a minimum of heat sensitivity.

More specifically our invention relates to the combination of a polyvinyl acetal resin and a vulcanizable vegetable or fish oil soluble therein and to the vulcanization of the oil component of the composition with preferred vulcanizing agents, the composition being amenable to mixing, milling, molding, calendering, frictioning and extruding similar to normal rubber compounds, and to the production of materials which are stable to change on aging, resistant to a wide range of temperature variation, resistant to paraffinic solvents, oils and ozone, of good electrical properties, and good tensile strength and appreciable elongation characteristic, among other advantages.

It is recognized that vinyl compounds or polyvinyl resins have been plasticized with many organic esters, alcohols and the like. Such resulting mixtures or solutions are characterized in general by their toughness, flexibility and elasticity at room temperature, these properties, of course, being modified by the selection and proportion of the constituents. One serious fault, however, has been their sensitiveness to heat. Depending on the amount of plasticizer, such compositions lose strength and resistance to flow at temperatures of from 120 to 200° F. and may actually melt at 300° F. Also their cold resistance is relatively poor, much below 32° F., the composition freezing and becoming brittle. Such sensitivity to temperature has precluded their use in many places where rubber or chloroprene are used. For example, resistance to heat is necessary in steam packing compositions, ignition wire insulations, steam and hot water hose, and mechanical rubber articles exposed to variations in temperature.

It is likewise well known that oils such as linseed, soyabean, cottonseed, corn and the like, which are normally liquid, can be set or solidified by the action of heat and reagents such as sulphur chloride, benzoyl, peroxide, boron fluoride, etc., to form materials which while stable to temperature change and are resilient, have poor elasticity and are "short" or weak to a shearing force.

The present invention relates to the combination of oils of the foregoing class and like drying, semi-drying, or non-drying oils, preferably in the blown forms, as hereinafter more fully set forth, and which have considerable absolute ethyl alcohol solubility and are compatible with the polyvinyl acetal resins, and which can be vulcanized in association, distribution or solution therewith by means of oxidizing vulcanizers to form products of greatly reduced thermoplasticity and of increased cold resistance.

The polyvinyl acetals made use of by us in accordance with the present invention are a family of resins made from polyvinyl acetate by the successive or combined steps of hydrolysis and condensation with aldehydes. Thus for example, polyvinyl acetate is hydrolyzed to yield polyvinyl alcohol, and the polyvinyl alcohol is caused to react with an aldehyde such as butyraldehyde to form polyvinyl butyral. Similarly the use of a formaldehyde or acetaldehyde results respectively in the corresponding formal or acetal, the resins being recovered and used in the form of granular preciptiates.

As previously indicated, the oils used by us in combination with the polyvinyl acetals and as plasticizers therefor are vulcanizable vegetable or fish oils of the factice forming type having considerable absolute ethyl alcohol solubility and compatibility with those resins, at least in and preferably in the blown state. Thus although we may use such oils as linseed, soyabean, cottonseed, corn, perilla, menhaden, pilchard, oiticica, hempseed and the like in either the blown or unblown state, others such as castor and China wood oil are preferably useful and of good compatibility with these resins only in the blown state. It may likewise be stated that all of the foregoing oils are preferably used in the blown state in which they have greater absolute ethyl alcohol solubility than their unblown original oils and can be used in greater proportion when such is desirable. It will therefore be understood that the term oil of the factice producing type as used in the within specification and claims is intended to include those oils either thus generically designated, or individually or specifically designated which are capable of being vulcanized as herein set forth, in either the unblown or fluid blown state, or the blown state alone.

In order to obtain the maximum of the foregoing desirable properties of alcohol solubility and compatibility we have found that the most satisfactory form of oil is one which has been air or oxygen blown to an extent where it has a viscosity of from about 2 to about 100 poises, and preferably in the range of from about 10 to about 20 poises at normal room temperature or about 72° F. This blowing is preferably conducted at a relatively low treatment temperature such as from about 75 to about 160° F., although the blowing may be conducted at temperatures as high as about 350° F. but not with fully equivalent result, the low temperature blowing being preferable since there is more conversion and less break-down product present.

It will also be understood that each of these oils and the resins are not necessarily equivalent in the character of the result produced, and that varying proportions to accomplish related results may be required. Also the conditions of compounding may likewise be dependent on the particular oils, resins and other compounding materials and the specific use of the resultant product.

In accordance with the present invention we have found that oxidizing type vulcanizing agents effectively serve to vulcanize the aforesaid compatible factice forming type of vegetable oils while in intimate plasticized association with the polyvinyl acetal resin. Thus we are able to form mixed compounds of these resins and oils wherein at least the oil component can be vulcanized and the mixture due to the aforesaid association caused to be thereby thermosetting. Among such suitable vulcanizing agents may be mentioned lead peroxide, benzoyl peroxide, chromic oxide and the like compositions from which oxygen is evolved at vulcanization temperatures, such as for example, 240 to 310° F. In association with these vulcanizing agents we may use suitable accelerators such as paraquinone dioxime and the like rubber vulcanization accelerators.

In compounds of the aforesaid resins and oils, the oils not only act as composition or product modifying materials but as plasticizers for the resins, and can be used in much higher concentrations than the heretofore conventional plasticizers without unduly softening the resulting mix, and this provides for appreciable economy of the resins. As an example, it is possible to formulate mixes including conventional rubber compounding agents, which on vulcanization have a tensile strength of 1200 to 1500 pounds per square inch and an elongation of 200% with as little as 30% of a polyvinyl acetal resin by weight of the composition. Depending upon the nature of the ultimate product desired we may incorporate from about 20 to about 200 and preferably about 30 to about 100 parts by weight of the oils to 100 parts by weight of the resins. With the lower proportion of oil tensile strength of 2500 pounds per square inch with 150% elongation can be obtained. The addition of our oils also increases the freeze resistance of the vulcanizate so that it is possible to formulate mixes capable of flexibility at −50° F., in addition to being stable at temperatures of 200 to 300° F. for long periods without marked change.

Methods of incorporting the vulcanizable oil and the polyvinyl acetal resin may vary widely depending on the nature and condition of the resin and the characteristic solubility or compatibility of the resin with the oil. Thus for example the dry resin powder may be mixed by wetting it with the oil, allowed to stand for a short time and then thoroughly combined in an internal type mixer or on a rubber mill at a temperature of from about 200 to about 300° F., depending on the softening point of the resin.

On the other hand it is generally more convenient to first employ a coupling solvent or plasticizer which induces compatibility at lower temperatures and produces a uniform single phase mixture. These coupling solvents may be of the volatile or non-volatile type, but should not be of a type or in such proportion as to prevent the combination from vulcanizing. These coupling solvents may be of the organic ester, ether or acetone type and specifically such materials as "Flexol-3GH" (triethylene glycol di-2-ethylbutyrate), methyl ethyl ketone, isopropyl alcohol, dibutyl sebacate, phthalate, etc., have been found satisfactory.

As an example of a typical compound having good properties and the procedural composition steps, 100 parts by weight of polyvinyl butyral resin in the unplasticized granular form, 100 parts by weight of 10 to 20 poise at 72° F. low temperature blown linseed oil, and 20 parts by weight of Flexol-3GH may be thoroughly mixed in a dough or any other appropriate type of mixer to provide a loose mixed mass of oily granules. This mass may then be seasoned in a warm atmosphere to permit good diffusion of the plasticizers in the resin to convert it into a rubbery plastic mass which can then be put on a hot rubber mill or in a Banbury mixer for mastication. In this mastication step further compounding may be carried out by addition of fillers as in the compounding of rubber such as channel black, together with addition of the vulcanizing agent, which may be 5 parts by weight of chromic oxide.

The resulting compound has the general physical appearance of milled uncured rubber and may then be handled and vulcanized in a manner similar to rubber compounds and similarly molded, extruded, frictioned and calendered. Thus the compound may be formed in molds and a $\frac{1}{16}$ inch slab cured in 20 to 30 minutes at a temperature of about 290° F. to 310° F. As an indication of the degree of vulcanization, cured material can be stripped from the hot mold at 300° F. with a permanent set, which of course is not possible with a thermoplastic material, as the latter even if molded hot, must be cooled before removing from the mold. Vulcanization may also be accomplished in open steam or hot water. Hot air cures can also be made on coated or spread cloth, the composition for spreading having first been made into a dough with a solution such as a blend of 20% isopropyl alcohol and 80% of an aromatic such as toluol, xylol, etc., the spread composition being curable at temperatures as low as 250° F. for ½ to 1 hour.

|  | Compound No. | | |
|---|---|---|---|
|  | 1 | 2 | 3 |
| Polyvinyl butyral resin | 100 | 100 | 100 |
| Fluid low temperature blown linseed oil | 20 |  | 100 |
| Fluid low temperature blown castor oil |  | 50 |  |
| Flexol-3GH |  | 20 |  |
| Dibutyl sebacate |  |  | 20 |
| Channel black | 25 | 42 | 55 |
| Stearic acid | 2 | 2 | 2 |
| Lead peroxide | 10 |  |  |
| Benzoyl peroxide |  | 5 |  |
| Chromic oxide |  |  | 5 |
| Paraquinone dioxeme | 2 | 2 |  |

CURED 20 MINUTES AT 310° F.

| | | | |
|---|---|---|---|
| Tensile strength, lbs. per sq. in | 2,200 | 2,100 | 1,000 |
| Elongation, per cent | 160 | 200 | 190 |
| Durometer hardness | 82 | 73 | 66 |

7 DAYS AGING IN GEER OVEN AT 158° F.

| | | | |
|---|---|---|---|
| Tensile strength, lbs. per sq. in | 3,400 | 3,200 | 1,500 |
| Elongation, per cent | 78 | 110 | 100 |
| Durometer hardness | 99 | 93 | 84 |
| Cold test 96 hours at 0° F | (1) | (1) | (1) |
| Cold test 96 hours at −50° F | (2) | (1) | (1) |
| Per cent swelling in M-222 aviation gas, 96 hours at room temperature | 4.0 | 12.0 | 14.0 |

[1] Flexible.
[2] Brittle.

Thus in accordance with our invention we have been enabled to form plastic compositions of rubber-like properties composed essentially of the polyvinyl acetal resins and a compatible, vulcanizable non-volatile oil of the factice forming type, the composition after vulcanization by means of an oxidizing or oxygen emanating material being of greatly reduced thermoplasticity and able to stand exposure to temperatures in the range of 200 to 300° F. for long periods of time without marked change and being characterized by toughness, flexibility and elasticity over a wide range of conditions, and remaining flexible at temperatures ranging down to −50° F. In addition its excellent resistance to paraffinic solvents and oils, other than aromatic solvents puts it in a class with such synthetics as Neoprene and the like, and may be used for many purposes where rubber is now used.

Suitable uses of our compositions have been found in steam packing compositions, ignition wire insulations, steam and hot water hose, mechanical rubber articles exposed to variations in temperature, raincoats, hospital sheeting, and many other articles and uses.

We claim as our invention:

1. The method of forming a heat stable and cold resistant rubber-like plastic composition which comprises combining and plasticizing a polyvinyl acetal resin with from about 20% to about 200% by weight thereof of a factice producing glyceride oil, and curing said composition at a temperature of from about 240° F., to about 310° F., for a period of from about twenty to about sixty minutes in the presence of a vulcanizing agent adapted to liberate oxygen at said temperature.

2. The method of forming a heat stable and cold resistant rubber-like plastic composition which comprises combining and plasticizing a polyvinyl acetal resin with from about 20% to about 200% by weight thereof of a compatible fluid blown factice producing glyceride oil having appreciable ethyl alcohol solubility, and curing the oil in said composition to thermoset condition by heating the composition at a temperature of from about 240° F., to about 310° F., in the presence of a vulcanizing agent adapted to liberate oxygen at said temperature.

3. The method of forming a heat stable and cold resistant rubber-like plastic composition which comprises combining and plasticizing a polyvinyl acetal resin with from about 20% to about 200% by weight thereof of a factice producing glyceride oil and curing the oil in said composition to thermoset condition by heating with oxygen at a temperature of from about 240° F., to about 310° F.

4. The method of forming a heat stable and cold resistant rubber-like plastic composition which comprises combining and plasticizing a polyvinyl acetal resin with from about 50% to about 100% by weight thereof of a factice producing glyceride oil and curing said composition to thermoset condition by heating at a temperature of from about 240° F., to about 310° F., in the presence of a vulcanizing agent adapted to liberate oxygen at said temperature.

5. The method of forming a heat stable and cold resistant rubber-like plastic composition which comprises combining and plasticizing a polyvinyl acetal resin with from about 20% to about 200% by weight thereof of a factice producing glyceride oil and curing said composition to thermoset condition by heating at a temperature of from about 240° F., to about 310° F., in the presence of a vulcanizing agent adapted to liberate oxygen at said temperature.

6. The method of forming a heat stable and cold resistant rubber-like plastic composition which comprises combining and plasticizing a polyvinyl acetal resin with from about 20% to about 200% by weight thereof of a compatible fluid blown factice producing glyceride oil having a viscosity of from about 10 to about 20 poises at 72° F., and curing the oil in said composition to thermoset condition by heating at a temperature of from about 240° F., to about 310° F., in the presence of a vulcanizing agent adapted to liberate oxygen at said temperature.

7. A thermoset heat stable and cold resistant, tough, flexible, elastic, rubber-like plastic composition comprising a polyvinyl acetal resin in plasticized association with from about 20% to about 200% by weight thereof of a compatible factice producing glyceride oil, produced by heating the resin and oil to a temperature of about 240° F., to about 310° F., in the presence of a vulcanizing agent adapted to liberate oxygen at said temperature.

8. A thermoset heat stable and cold resistant, tough, flexible, elastic, rubber-like plastic composition comprising a polyvinyl acetal resin in plasticized association with from about 50% to about 100% by weight thereof of a fluid blown compatible factice producing glyceride oil, produced by heating the resin and oil to a temperature of about 240° F., to about 310° F., in the presence of a vulcanizing agent adapted to liberate oxygen at said temperature.

9. A thermoset heat stable and cold resistant, tough, flexible, elastic, rubber-like plastic composition comprising polyvinyl acetal in plasticized association with from about 20% to about 200% by weight thereof of a fluid blown factice forming glyceride oil, produced by heating the resin and oil to a temperature of about 240° F., to about 310° F., in the presence of a vulcanizing agent adapted to liberate oxygen at said temperature.

10. A thermoset heat stable and cold resistant, tough, flexible, elastic, rubber-like plastic composition comprising polyvinyl butyral in plasticized association with from about 20% to about 200% by weight thereof of a fluid blown factice forming glyceride oil, produced by heating the resin and oil to a temperature of about 240° F., to about 310° F., in the presence of a vulcanizing agent adapted to liberate oxygen at said temperature.

11. A thermoset heat stable and cold resistant, tough, flexible, elastic, rubber-like plastic composition comprising a polyvinyl acetal resin in plasticized association with from about 20% to about 200% by weight thereof of fluid blown linseed oil, produced by heating the resin and oil to a temperature of about 240° F., to about 310° F., in the presence of a vulcanizing agent adapted to liberate oxygen at said temperature.

12. A thermoset heat stable and cold resistant, tough, flexible, elastic, rubber-like plastic composition comprising a polyvinyl acetal resin in plasticized association with from about 20% to about 200% by weight thereof of fluid blown castor oil, produced by heating the resin and oil to a temperature of about 240° F., to about 310° F., in the presence of a vulcanizing agent adapted to liberate oxygen at said temperature.

13. The method of forming a heat stable and cold resistant rubber-like plastic composition which comprises combining and plasticizing a polyvinyl acetal resin with from about 20% to about 200% by weight thereof of a factice producing glyceride oil, and curing the oil in said composition to thermoset condition by heating the composition at a temperature of from about 240° F., to about 310° F., in the presence of an organic peroxide adapted to liberate oxygen at said temperature.

IZADOR J. NOVAK.
JOSEPH N. KUZMICK.